(12) United States Patent
Yoshimoto

(10) Patent No.: US 8,452,665 B2
(45) Date of Patent: May 28, 2013

(54) COMMODITY SALES SYSTEM, TERMINAL, AND METHOD OF CONTROLLING THE TERMINAL

(75) Inventor: Seiji Yoshimoto, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/832,270

(22) Filed: Jul. 8, 2010

(65) Prior Publication Data

US 2011/0010259 A1 Jan. 13, 2011

(30) Foreign Application Priority Data

Jul. 9, 2009 (JP) .................................. 2009-162950

(51) Int. Cl.
*G06Q 30/00* (2012.01)
(52) U.S. Cl.
USPC ........................................................ 705/26.1
(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 7,519,546 B2 * | 4/2009 | Murren et al. .............. | 705/26.61 |
| 2002/0082961 A1 * | 6/2002 | Abrahm et al. ................ | 705/35 |
| 2003/0120555 A1 * | 6/2003 | Kitagawa .................... | 705/26 |
| 2006/0069635 A1 * | 3/2006 | Ram et al. ................... | 705/37 |
| 2011/0087581 A1 * | 4/2011 | Ram et al. ................... | 705/37 |

FOREIGN PATENT DOCUMENTS

| | | |
|---|---|---|
| JP | 05-325042 | 12/1993 |
| JP | 10-124755 | 5/1998 |
| JP | 10-241044 | 9/1998 |
| JP | 2001-229255 | 8/2001 |
| JP | 2008-293180 | 12/2008 |

OTHER PUBLICATIONS

Browning, Dave "Database design techniques.", PC Tech Journal, v5, n7, p112(2), Jul. 1987. Retrieved from Dialog File: 275, Acc#: 01208709.*

Japanese Office Action for Application No. 2009-162950 mailed on Apr. 19, 2011.

* cited by examiner

*Primary Examiner* — Naeem Haq
(74) *Attorney, Agent, or Firm* — Turocy & Watson, LLP

(57) ABSTRACT

According to one embodiment, a handy terminal includes an information detecting unit, a storing unit, a declaring unit, a selection receiving unit, an input receiving unit, and a cancellation control unit. The information detecting unit detects commodity information. The storing unit stores sales data in which the numbers of sold items of the commodities are added to the commodity information. The declaring unit declares cancellation of the sales data. The selection receiving unit receives selection of a commodity as a cancellation target. The input receiving unit receives the input of the number of items to be cancelled. The cancellation control unit deducts the number of items, the input of which is received by the input receiving unit, from the number of sold items added to the sales data of the commodity as the cancellation target stored in the storing unit.

5 Claims, 7 Drawing Sheets

| No. | Commodity code | Commodity name | Unit price | Number of items | | |
|---|---|---|---|---|---|---|
| 1 | 1001 | Commodity name A | 254 | 3 | | |
| 2 | 1002 | Commodity name B | 100 | 5 | | |
| 3 | 1003 | Commodity name C | 99 | 3 | | |

Commodity list

| Commodity | Number of items | Amount |
|---|---|---|
| Commodity A | | |
| | 3 | 735 |
| Commodity B | | |
| | 3 | 300 |
| Commodity C | | |
| | 3 | 297 |

Total    9 Items    1,332 Yen

[ Register commodity ]  ( Cancel )

FIG. 9

Commodity list

| Commodity | Number of items | Amount |
|---|---|---|
| Commodity A | | |
| | 3 | 735 |
| Commodity B | | |
| | 3 | 300 |
| Commodity C | | |
| | 3 | 297 |

Total    9 Items    1,332 Yen

[ Register commodity ]  ( Cancel )

FIG. 11

COMMODITY SALES SYSTEM, TERMINAL, AND METHOD OF CONTROLLING THE TERMINAL

CROSS-REFERENCE TO RELATED APPLICATION

This application is based upon and claims the benefit of priority from Japanese Patent Application No. 2009-162950, filed Jul. 9, 2009; the entire contents of which are incorporated herein by reference.

FIELD

Embodiments described herein relate generally to a commodity sales system in which a customer himself or herself inputs a commodity code and carries on a checkout job in a commodity sales store, a handy terminal used in the system, and a method of controlling the handy terminal.

BACKGROUND

In the past, in checkout jobs in commodity sales stores such as a supermarket and a convenience store, a commodity sales data processing apparatus such as a POS (Point Of Sales) terminal including a barcode scanner for reading barcodes attached to commodities is used.

The apparatus of this type is operated by a store clerk. The store clerk reads a barcode attached to a commodity with the barcode scanner and inputs a commodity code, acquires commodity information including a commodity name and a unit price from a database of a store server or the like on the basis of the commodity code, and registers, in a predetermined storage area formed in a memory, sales data in which the number of purchased items and the like are added to the commodity information. The store clerk calculates a price and issues a receipt on the basis of sales data registered in one transaction and completes the checkout job.

Assuming a situation in which a customer gives up the purchase of a commodity carried to a register and asks to cancel the purchase, the commodity sales data processing apparatus usually has a function for canceling sales data of a commodity once registered. An apparatus having such a function is disclosed in, for example, JP-A-05-325042.

In recent years, in order to reduce personnel assigned to the checkout job and realize efficiency of the job, a commodity sales system employing a PSS (Personal Self Shopping) system in which a customer himself or herself performs, for example, reading of a barcode is spreading. In the system of this type, a handy terminal having a barcode scanning function is handed to a customer who visits a store. The customer scans, when the customer himself or herself puts a commodity in a shopping basket, a barcode attached to the commodity using the handy terminal and inputs a commodity code. At this point, the handy terminal accesses a store server through radio communication, acquires commodity information associated with the commodity code from the database, generates sales data on the basis of the commodity information, and registers the sales data in a storage area in a memory included in the handy terminal.

When registration of a series of commodities is finished in this way, the customer transmits sales data stored in the handy terminal to a POS terminal. The customer completes a checkout job by himself or herself or under the initiative of the store clerk.

Like the commodity sales data processing apparatus, the existing handy terminal used in this system has the function for canceling sales data. In the existing handy terminal, after operating an operation unit and declaring cancellation of sales data, when the customer scans a barcode attached to a commodity again and inputs a commodity code, sales data based on the commodity code is cancelled from the storage area.

However, the existing handy terminal does not have a function for designating the number of items to be cancelled. Even if a large number of same commodities are registered, under the present situation, the customer has to scan barcodes attached to all the commodities one by one and cancel sales data of the commodities. Therefore, time and labor are required for the cancellation.

Further, it takes a lot of time for the customer to take out commodities from a shopping basket one by one, specify print positions of barcodes, and scan the barcodes. When the customer cancels sales data concerning a large number of commodities, extremely long time is required.

BRIEF DESCRIPTION OF THE DRAWINGS

FIG. 9 is a schematic diagram of an example of the cancellation screen after a commodity is cancelled in the embodiment;

FIG. 11 is a schematic diagram of an example of a cancellation screen after a commodity is cancelled in the embodiment.

DETAILED DESCRIPTION

Figure 1:
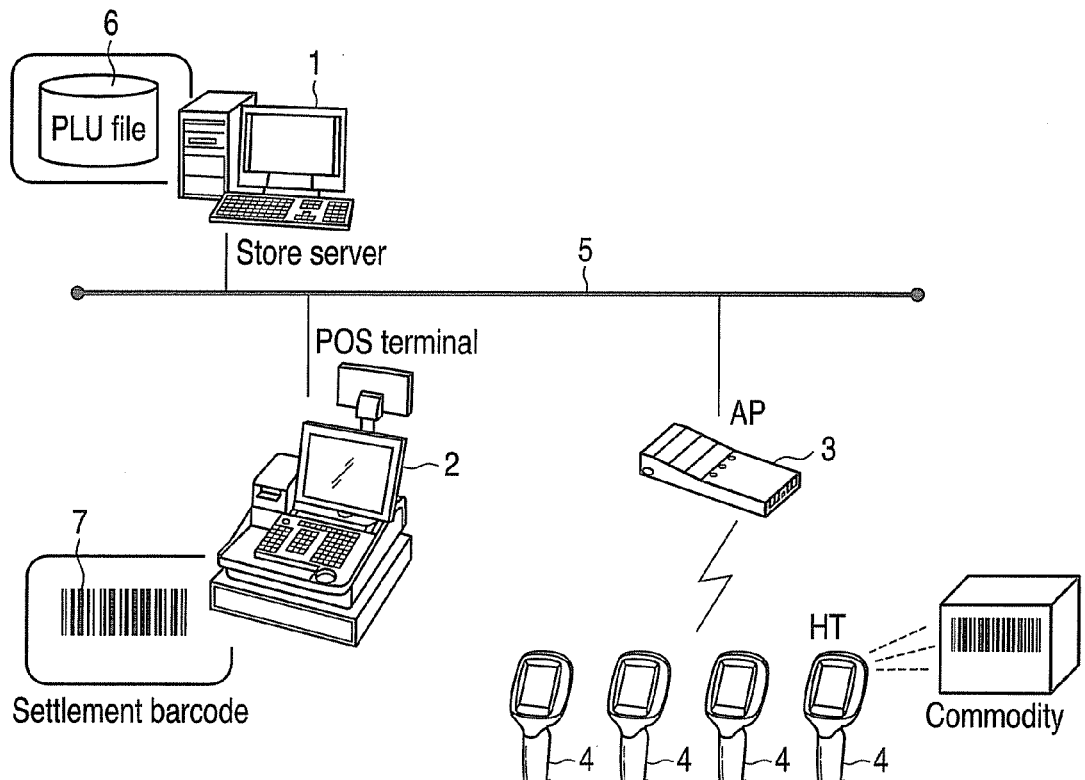
FIG. 1 is a diagram of a commodity sales system in a first embodiment.

In general, according to one embodiment, a handy terminal includes an information detecting unit, a storing unit, a declaring unit, a selection receiving unit, an input receiving unit, and a cancellation control unit. The information detecting unit detects commodity information of commodities purchased by a customer. The storing unit stores sales data in which the numbers of sold items of the commodities are added to the commodity information detected by the information detecting unit. The declaring unit declares cancellation of the sales data stored in the storing unit. The selection receiving unit receives, in response to the declaration of the cancellation by the declaring unit, selection of a commodity as a cancellation target out of the commodities indicated by the sales data stored in the storing unit. The input receiving unit receives the input of the number of items to be cancelled of the commodity, the selection of which is received by the selection receiving unit. The cancellation control unit deducts the number of items, the input of which is received by the input receiving unit, from the number of sold items added to the sales data of the commodity as the cancellation target stored in the storing unit.

First Embodiment

A first embodiment is explained below with reference to the accompanying drawings. In the following explanation, components having the same functions and configurations are denoted by the same reference numerals and signs and redundant explanation of the components is provided only when necessary.

FIG. 1 is a diagram of a commodity sales system in this embodiment.

The commodity sales system includes a store server 1, a POS terminal 2, an access point 3, and plural handy terminals 4. The store server 1, the POS terminal 2, and the access point 3 are connected to be capable of communicating one another by a LAN (Local Area Network) 5.

The store server 1 functions as a server apparatus in this embodiment. The store server 1 stores and manages, for example, sales data in a store in which the commodity sales system operates and a PLU (Price Look Up) file 6. In the PLU file 6, commodity information including a commodity name and a unit price is stored with respect to a commodity code (an identifier) uniquely allocated to each commodity.

The POS terminal 2 functions as the commodity sales data processing apparatus in this embodiment. The POS terminal 2 is placed on a register counter to which a settlement barcode 7 used in processing explained later is stuck. A main body of the POS terminal 2 includes a keyboard on which various operation keys are disposed, a display unit configured to display various kinds of information to a store clerk or a customer, a receipt printer configured to issue a receipt, and a coin input unit, a bill input unit, a coin discharge unit, and a bill discharge unit used for exchange of cash and change. A store clerk is not posted at a register counter where the POS terminal 2 is set. Specifically, the POS terminal 2 is a POS terminal of a self checkout type that a customer himself or herself operates to perform checkout processing such as payment of a price.

When the access point 3 receives a radio wave transmitted from the handy terminal 4, the access point 3 generates digital data on the basis of a high-frequency signal obtained from the radio wave and transmits the digital data to the LAN 5. When the access point 3 receives, via the LAN 5, transmission data to the handy terminal 4, the access point 3 generates a high-frequency signal on the basis of the transmission data and transmits the high-frequency signal to the handy terminal 4 as a radio wave.

The handy terminal 4 is handed to a customer who visits the store and collected when the customer leaves the store. The customer reads a barcode attached to a commodity by himself or herself using the handy terminal 4.

Figure 2:
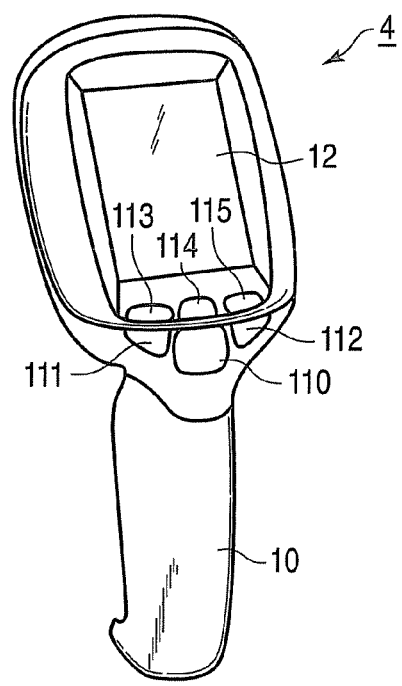
FIG. 2 is a schematic diagram of the external configuration of a handy terminal in the embodiment.

FIG. 2 is a schematic diagram of an example of the external configuration of the handy terminal 4. The handy terminal 4 includes a grip 10, an operation unit 11 including operation buttons 110 to 115, and a display unit 12 employing an LCD (Liquid Crystal Display). A reading window for a scanner not shown in the figure is provided on the rear surface of the handy terminal 4.

Figures 3, 4:
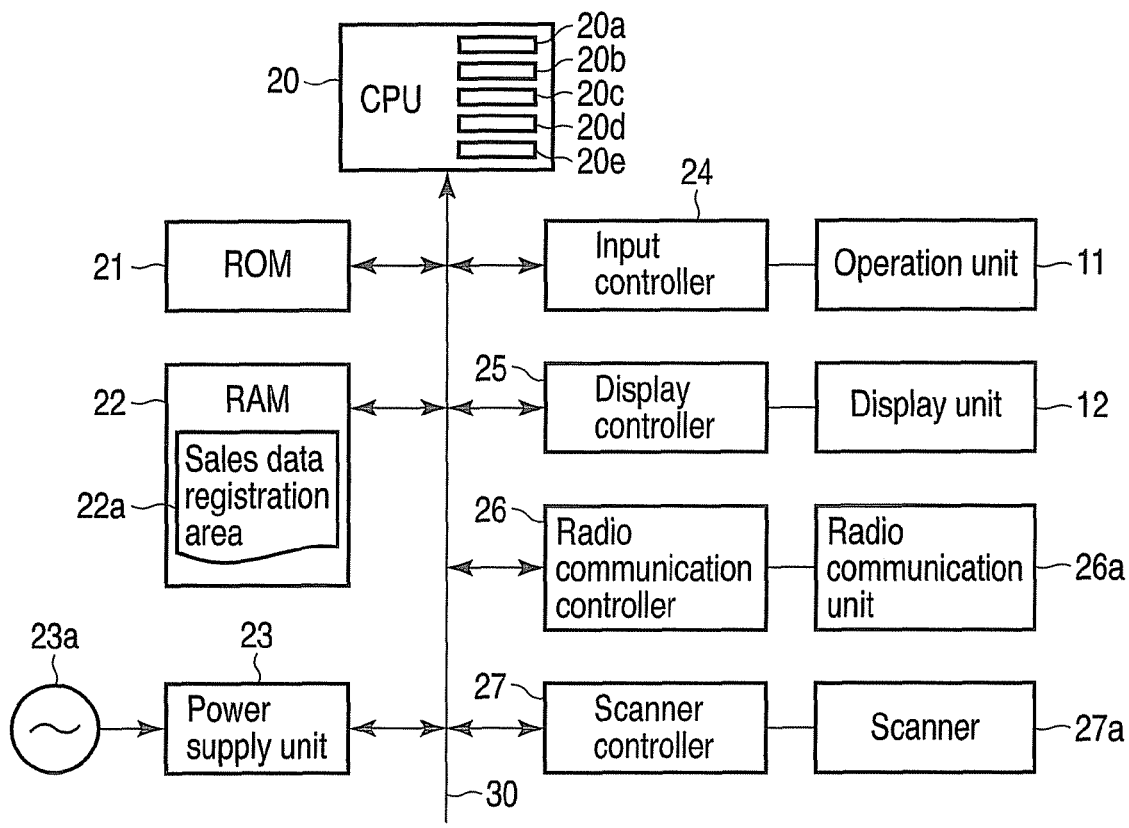
FIG. 3 is a block diagram of a control circuit for the handy terminal in the embodiment.
FIG. 4 is a schematic diagram of a data structure of a sales data registration area in the embodiment.

A control circuit for the handy terminal 4 is shown in FIG. 3. The control circuit is configured by connecting, to a CPU 20 functioning as a main control unit for the handy terminal 4, a ROM (Read Only Memory) 21, a RAM (Random Access Memory) 22, a power supply unit 23, an input controller 24, a display controller 25, a radio communication controller 26, and a scanner controller 27 via a bus line 30 such as an address bus or a data bus.

A battery 23a is connected to the power supply unit 23, the operation unit 11 is connected to the input controller 24, the display unit 12 is connected to the display controller 25, a radio communication unit 26a is connected to the radio communication controller 26, and a scanner 27a is connected to the scanner controller 27.

The ROM 21 is a nonvolatile memory and stores therein, for example, a basic computer program necessary for the operation of the handy terminal 4 and unique terminal IDs allocated to terminals connected to the LAN 5.

Various storage areas for work are formed in the RAM 22 according to processing situations. For example, when registration processing for sales data is executed, a sales data registration area 22a is formed in the RAM 22. The sales data registration area 22a is a storage area for work for registering commodity information and has, for example, a data structure shown in FIG. 4. Specifically, a registration area for sales data in which the number of sold items of a sold commodity is added to commodity information including a commodity code, a commodity name, and a unit price of the commodity is formed. In an example shown in the figure, sales data including a commodity code "1001", a commodity name "commodity A", a unit price "245" yen, and the number of items "3" is registered in an area No. 1. Sales data including a commodity code "1002", a commodity name "commodity B", a unit price "100" yen, and the number of items "5" is registered in an area No. 2. Sales data including a commodity code "1003", a commodity name "commodity C", a unit price "99" yen, and the number of items "3" is registered in an area No. 3. The sales data registration area 22a functions as a storing unit in this embodiment.

The power supply unit 23 captures operation power from the battery 23a and supplies the operation power to the units of the handy terminal 4. When an external power supply such as a commercial AC power supply is connected to a not-shown connector, the power supply unit 23 captures power from the external power supply, supplies the power to the battery 23a, and charges the battery 23a. The battery 23a is detachably attached to the handy terminal 4 and can be easily removed from a housing and replaced.

The input controller 24 monitors depression of the operation buttons 110 to 115 included in the operation unit 11 and notifies the CPU 20 of a signal corresponding to a depressed operation button. The operation unit 11 also functions as a declaring unit configured to declare cancellation of sales data stored in the sales data registration area 22a.

The display controller 25 converts image data sent from the CPU 20 into a video signal, outputs the video signal to the display unit 12, and causes the display unit 12 to selectively display various kinds of information.

The radio communication controller 26 controls radio communication with the access point 3 by the radio communication unit 26a. The radio communication unit 26a includes a transmitting unit configured to modulate data sent from the radio communication controller 26 into a high-frequency signal, an antenna configured to emit a radio wave based on the high-frequency signal modulated by the transmitting unit and generate a high-frequency signal based on the radio wave emitted by the access point 3, and a receiving unit configured to demodulate the high-frequency signal generated by the antenna into digital data.

The scanner controller 27 controls the scanner 27a to control timing for reading a barcode (a symbol code) and notifies the CPU 20 of barcode data detected by the scanner 27a. The scanner 27a includes a photosensor configured to optically read a barcode and output an analog signal, an A/D converter configured to convert the analog signal output from the photosensor into a digital signal, and a decoder configured to decode the digital signal output from the A/D converter into barcode data. The scanner 27a functions as a reading unit in this embodiment.

In the handy terminal 4 having such a configuration, the CPU 20 executes operation programs stored in the ROM 21 to thereby realize units explained in (1) to (5) below.

(1) An information detecting unit 20a configured to detect commodity information of commodities purchased by a customer. In particular, in this embodiment, the information detecting unit 20a transmits barcode data read by the scanner 27a from a barcode attached to a commodity purchased by a customer to the store server 1 and receives commodity information returned from the store server 1 to detect commodity information.

(2) A selection receiving unit 20b configured to receive selection of a commodity as a cancellation target out of commodities indicated by sales data registered in the sales data registration area 22a. In particular, in this embodiment, the selection receiving unit 20b displays a cancellation screen 120 explained later on the display unit 12 and receives, according to the operation of the operation unit 11, selection of a commodity as a cancellation target out of sales data displayed as a list in the screen 120.

(3) An input receiving unit 20c configured to receive the input of the number of items to be cancelled of the commodity, the selection of which is received by the selection receiving unit 20b. In particular, in this embodiment, the input receiving unit 20c displays a number-of-items input screen 130 explained later on the display unit 12 and receives, as the number of items to be cancelled, a numerical value input to an input space of the screen 12 according to the operation of the operation unit 11.

(4) A cancellation control unit 20d configured to deduct the number of items, the input of which is received by the input receiving unit 20c, from the number of sold items added to the sales data of the commodity as the cancellation target registered in the sales data registration area 22a.

(5) An output unit 20e configured to output the sales data registered in the sales data registration area 22a to the POS terminal 2. In particular, in this embodiment, the output unit 20e outputs the sales data to the POS terminal 2 through radio communication performed by using the radio communication unit 26a.

The operation of the handy terminal 4 having the configuration explained above is explained below.

When a customer visits a store and starts registration of sales data after the handy terminal 4 is handed to the customer, the customer depresses a registration start button provided in the operation unit 11. With the depression of the registration start button as a trigger, an operation program for sales data registration stored in the ROM 21 is loaded to the RAM 22 and sales data registration processing is started.

Figure 5:
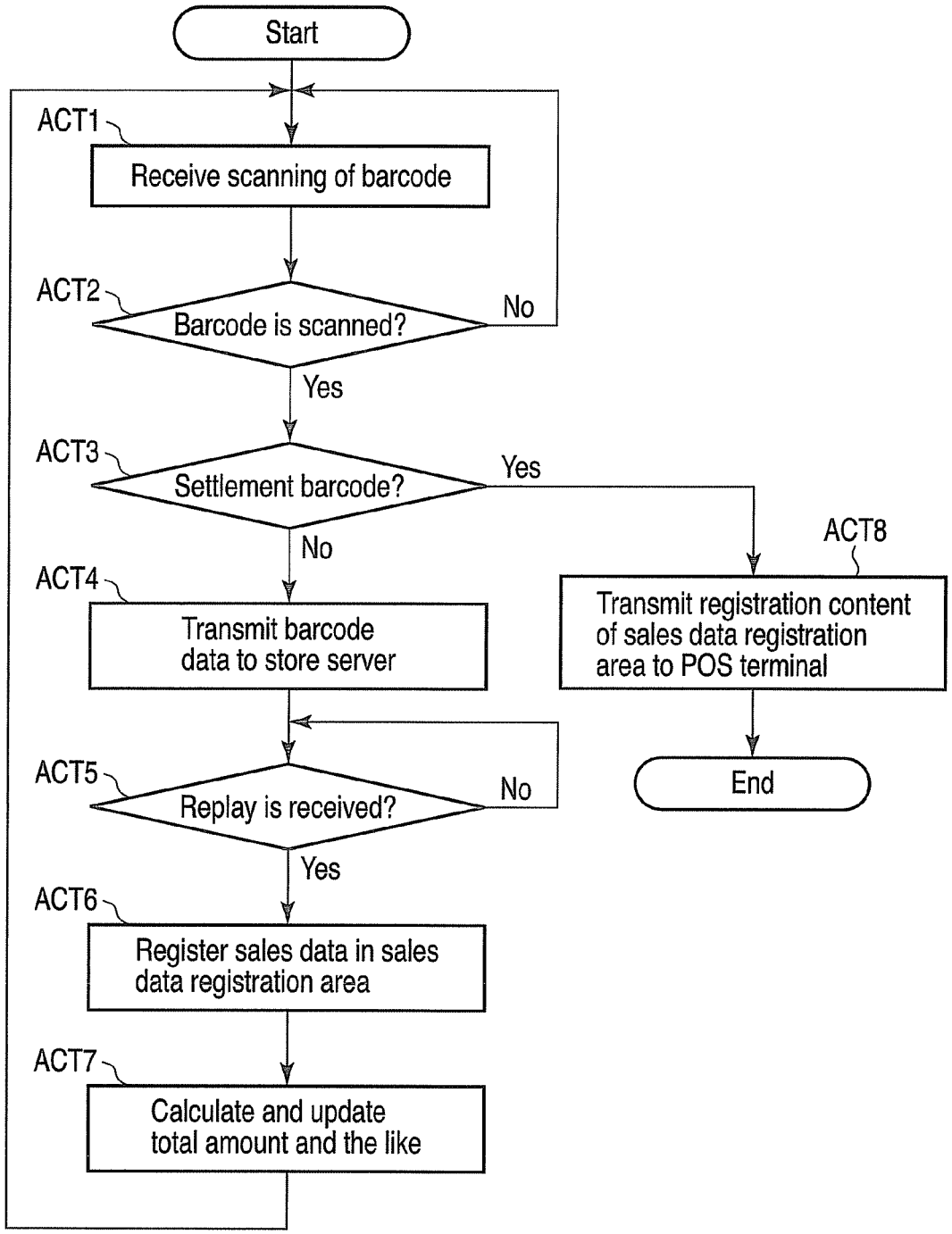
FIG. 5 is a flowchart for explaining processing executed by a CPU in sales data registration processing in the embodiment.

FIG. 5 is a flowchart of processing executed by the CPU 20 in the sales data registration processing.

First, the CPU 20 stays on standby in a state for receiving scanning of a barcode by the scanner 27a (Acts 1 and 2).

If a barcode is scanned according to operation by a customer (Yes in Act 2), the CPU 20 determines whether the scanned barcode is the settlement barcode 7 (Act 3). Barcode data of the settlement barcode 7 is stored in the ROM 21 in advance. Whether the scanned barcode is the settlement barcode 7 is determined according to coincidence or non-coincidence of the barcode data stored in the ROM 21 and the barcode data detected by the scanning.

If the barcode data detected by the scanning and the barcode data of the settlement barcode 7 do not coincide with each other, the CPU 20 determines that the scanned barcode is not the settlement barcode 7 (No in Act 3). The CPU 20 controls the radio communication controller 26 to drive the radio communication unit 26a and transmit the barcode data detected by the scanning and a terminal ID of the handy terminal 4 to the store server 1 (Act 4). The CPU 20 waits for a reply from the store server 1 (Act 5).

The access point 3 receives the barcode data and the terminal ID transmitted from the radio communication unit 26a and transmits these data to the store server 1 via the LAN 5. The store server 1 receives the data from the access point 3 and searches through the PLU file 6 to find the barcode data (i.e., a commodity code) in the received data. The store server 1 returns commodity information associated with the found commodity code to the handy terminal 4 indicated by the terminal ID in the received data. The access point 3 receives the return data via the LAN 5 and transmits the data to the handy terminal 4 through radio communication.

If the handy terminal 4 receives the return data transmitted in this way (Yes in Act 5), the CPU 20 combines the received commodity information and the number of sold items to create sales data and registers the sales data in the sales data registration area 22a formed in the RAM 22 (Act 6). If the customer designates the number of sold items via the operation unit 11, the CPU 20 creates and registers sales data in which the designated number of sold items and the commodity information are combined. If the number of sold items is not designated, the CPU 20 creates and registers sales data in which the number of sold items is "1".

After registering the sales data in the sales data registration area 22a, the CPU 20 calculates a total price of currently-registered commodities on the basis of unit prices and the numbers of sold items of sales data registered in the sales data registration area 22a, updates a total price displayed on the display unit 12 with the calculated total price, and adds content of the sales data added anew to display content of the display unit 12 (Act 7). Thereafter, the CPU 20 shifts to the state for receiving scanning of a barcode again and waits for the next scanning (Acts 1 and 2).

In this way, the customer scans a barcode of a purchased commodity while selecting commodities in the store. When the customer reaches the register counter on which the POS terminal 2 is set to pay a price, the customer scans the settlement barcode 7. At this point, barcode data detected by the scanning and the barcode data of the settlement barcode 7 coincide with each other. Therefore, the CPU 20 determines that the scanned barcode is the settlement barcode 7 (Yes in Act 3) and outputs, from the radio communication unit 26a, transmission data including registered content of the sales data registration area 22a and the terminal ID of the handy terminal 4 (Act 8). Thereafter, the CPU 20 ends the sales data registration processing.

The transmission data output from the handy terminal 4 is relayed by the access point 3 and transmitted to the POS terminal 2 via the LAN 5. The POS terminal 2 receives the data, calculates a total amount of this transaction, and displays the total amount on the display unit 12. When the customer pays the price via the bill input unit and the coin input unit, change is discharged via the bill discharge unit and the coin discharge unit, a receipt is printed and issued by the receipt printer, and checkout processing is completed.

The customer can operate the operation unit 11 during the execution of the sales data registration processing and declare cancellation of the sales data registered in the sales data registration area 22a. When the cancellation is declared, an operation program for sales data cancellation stored in the ROM 21 is loaded to the RAM 22 and sales data cancellation processing is started.

Figure 6:
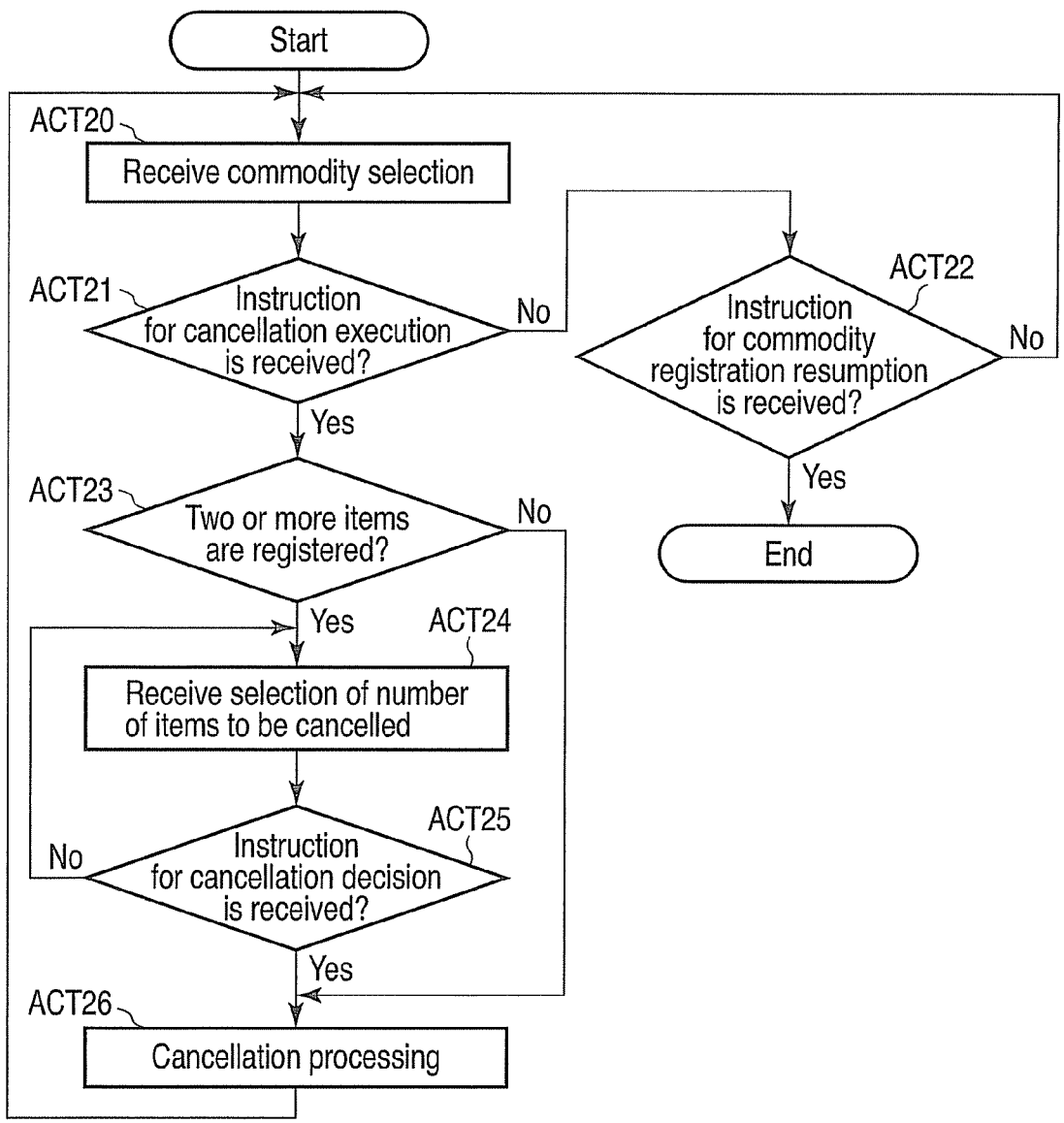
FIG. 6 is a flowchart for explaining processing executed by the CPU in sales data cancellation processing in the embodiment.

FIG. 6 is a flowchart of processing executed by the CPU 20 in the sales data cancellation processing.

First, in a state for receiving selection of sales data concerning a commodity as a cancellation target out of the sales data registered in the sales data registration area 22a (Act 20), the CPU 20 waits for an instruction for cancellation execution and an instruction for commodity registration resumption (Acts 21 and 22).

Figure 7:
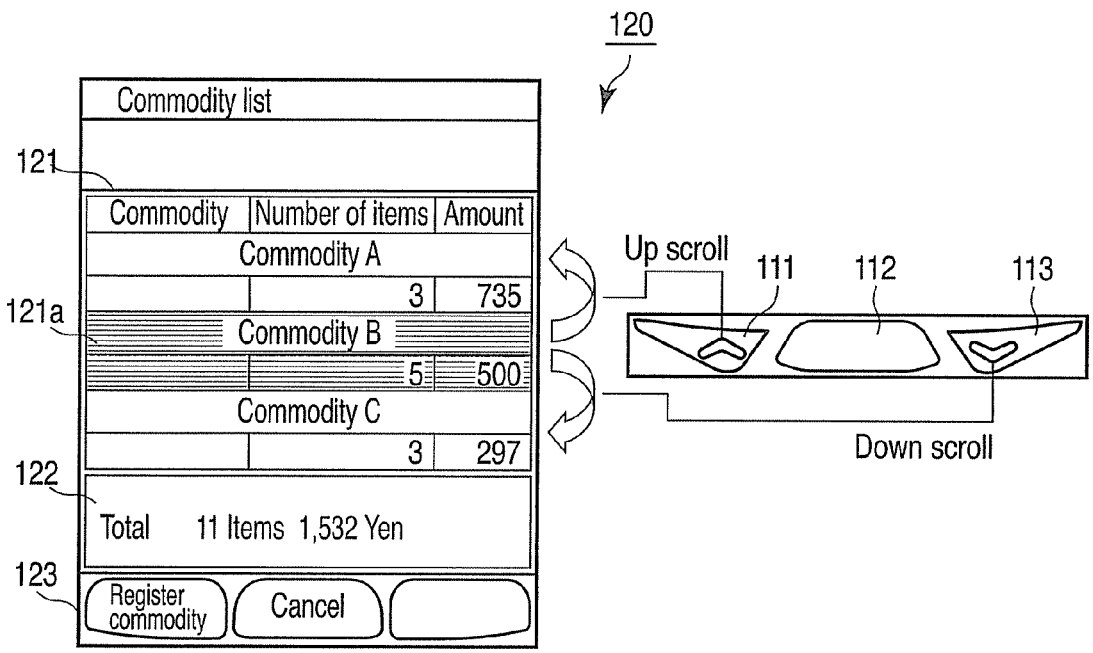
FIG. 7 is a schematic diagram of an example of a cancellation screen in the embodiment.

An example of the cancellation screen 120 displayed on the display unit 12 at this point on the basis of the registration content of the sales data registration area 22a shown in FIG. 4 is shown in FIG. 7. The screen 120 includes display areas 121 to 123.

In the display area 121, sales data registered in the sales data registration area 22a is displayed. In the display area 122, a total value of the numbers of items added to all registered sales data and a total amount calculated on the basis of all the registered sales data are displayed. In the display area 123, guidance for informing content of processing executed when the operation buttons 113 to 115 are depressed is displayed.

In this example, in the display area 121, sales data of "commodity A" (three items, 735 yen), "commodity B" (five items, 500 yen), and "commodity C" (three items, 297 yen) is displayed. In the display area 123, guidance indicating that the sales data registration processing is resumed according to the operation of the operation button 113 ("register commodity") and cancellation of a selected commodity is executed according to the operation of the operation button 114 ("cancel") is displayed.

A color of the background of a selection section 121a (in FIG. 7, a section where sales data related to the commodity B is displayed) in the display area 121 is changed such that the selection section 121a can be visually distinguished from sections where the other sales data is displayed. When the customer operates the operation button 111, the selection section 121a is scrolled upward. When the customer operates the operation button 112, the selection section 121a is scrolled downward.

Figure 8:
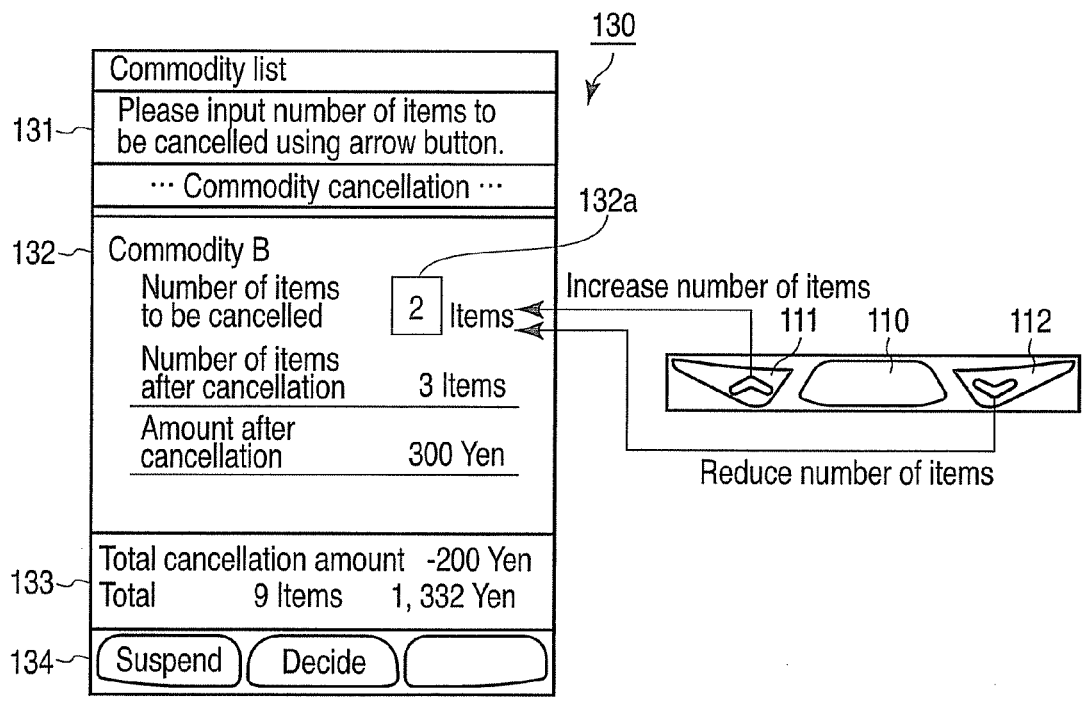
FIG. 8 is a schematic diagram of an example of a number-of-items input screen in the embodiment.

After a commodity as a cancellation target is selected according to the operation of the operation buttons 111 and 112 in this way, if the operation button 114 for cancellation execution, the guidance of which is displayed in the display area 123, is operated, the CPU 20 determines whether the number of sold items of the commodity related to the sales data shown in the selection section 121a is equal to or larger than two (Act 23). If the number of sold items of the commodity related to the sales data shown in the selection section 121a is equal to or larger than two (Yes In Act 23), the CPU 20 stays on standby in a state for receiving selection of the number of items to be cancelled of the commodity (Acts 24 and 25). An example of the number-of-items input screen 130 displayed on the display unit 12 at this point is shown in FIG. 8.

The screen 130 includes display areas 131 to 134. In the display area 131, a message for urging the user to select the number of items to be cancelled is displayed. In the display area 132, a commodity name of the commodity as a cancellation target ("commodity B"), the number of items to be cancelled of the commodity ("number of items to be cancelled"), the number of items of the commodity after cancellation ("number of items after cancellation"), and an amount calculated by multiplying the number of items with a unit price of the commodity ("amount after cancellation") are displayed. In the display area 133, a difference between a total amount calculated on the basis of all sales data before cancellation and a total amount calculated on the basis of all sales data after cancellation ("total cancellation amount") and a total amount calculated on the basis of a total value of the numbers of items added to all the sales data after cancellation and a total amount calculated on the basis of all the sales data after cancellation ("total") are displayed. In the display area 134, guidance for informing processing content performed when the operation buttons 113 to 115 are depressed is displayed.

In this example, the commodity B is selected as a cancellation target commodity. In the display area 134, guidance indicating that suspension of the sales data cancellation processing is executed according to the operation of the operation button 113 ("suspend") and cancellation content is decided according to the operation of the operation button 114 ("decide") is displayed.

If the operation button 111 is operated, a numerical value displayed in a number-of-items display area 132a in the display area 132 is counted up by one at a time. If the operation button 112 is operated, the numerical value displayed in the number-of-items display area 132a is counted down by one at a time. If the numerical value displayed in the number-of-items display area 132a is changed in this way, the number of items after cancellation, an amount after cancellation, a total amount of cancellation, a total number of items, and a total amount corresponding to the numerical value after the change are calculated. Display contents of the display areas 132 and 133 are updated.

After a numerical value is input to the number-of-items display areas 132a, if the operation button 114 for cancellation decision, the guidance of which is displayed in the display area 134, is depressed and decision of cancellation is declared (Yes in Act 25), the CPU 20 cancels the registered item according to the content displayed in the display area 132 (Act 26).

Specifically, the CPU 20 receives, as the number of items to be cancelled, the numerical value input to the number-of-items display area 132a and subtracts the received number of items from the number of sold items of the sales data registered in the sales data registration area 22a. If the number of sold items of the commodity related to the sales data shown in the selection section 121a is one in the processing in Act 23 (No in Act 23), the CPU 20 reduces the number of sold items of the sales data of the commodity registered in the sales data registration area 22a to zero without receiving the input of the number of items to be cancelled of the commodity. After performing the subtraction, the CPU 20 deletes the number-of-items input screen 130 and displays the cancellation screen 120 shown in FIG. 9 on the display unit 12.

The cancellation screen 120 shown in the figure is displayed when two items of the commodity B are cancelled from the sales data registration area 22a shown in FIG. 4. In the cancellation screen 120, two is subtracted from the number of sold items of the commodity B displayed in the display area 121 of the cancellation screen 120 shown in FIG. 7 and the number of sold items is reduced to three. Further, such that cancelled sales data and the other sales data can be visually distinguished, a cancellation section 121b in which sales data with all or a part of the number of sold items cancelled is displayed (in this example, a section where sales data of the commodity B is displayed) is displayed in a background color or a character color different from that of sections where the other sales data is displayed. Display forms of the sales data with all or a part of the number of sold items cancelled and the other sales data may be changed by a method other than the change of the background color or the character color.

After the sales data is cancelled in this way and the cancellation screen 120 clearly showing the cancellation section is displayed, in a state for receiving selection of a commodity again (Act 20), the CPU 20 waits for an instruction for cancellation execution and an instruction for commodity registration resumption (Acts 21 and 22). If there is no commodity that the user desires to cancel, the customer depresses, in order to resume commodity registration, the operation button 113 for commodity registration resumption, the guidance of which is displayed in the display area 123 of the cancellation screen 120. At this point, the CPU 20 determines that commodity registration resumption is instructed (Yes in Act 22), ends the sales data cancellation processing, and displays a screen for sales data registration on the display unit 12.

As explained above, the handy terminal 4 included in the commodity sales system in this embodiment enables the customer to cancel sales data of a commodity only with simple button operation without requiring work for scanning a barcode again even if the commodity is once registered as a purchased commodity.

After registering a large number of same commodities, even if the customer attempts to cancel sales data of the commodities, the customer does not need to scan barcodes attached to all the commodities one by one. The customer only has to select sales data via the cancellation screen 120 and input, via the number-of-items input screen 130, the number of items that the customer desires to cancel.

If the number of sold items of a commodity as a cancellation target is only one, the input of the number of items to be cancelled is not requested (No in Act 23). The input of the number of items to be cancelled is requested only when there is room for selection of the number of items to be cancelled. Therefore, this processing is convenient.

With such operation, it is possible to substantially improve operability for cancellation of sales data and reduce operation mistakes. Since the customer can comfortably enjoy shopping, an effect of improvement of an impression of a store can be expected.

Second Embodiment

A second embodiment is explained below with reference to the drawings.

This embodiment is different from the first embodiment in that, in the sales data cancellation processing, a customer scans a barcode attached to a commodity without using the operation buttons 111, 113 and the like to designate a commodity as a cancellation target. Components same as those in the first embodiment are denoted by the same reference numerals and signs and explanation of the components is omitted.

Figure 10:
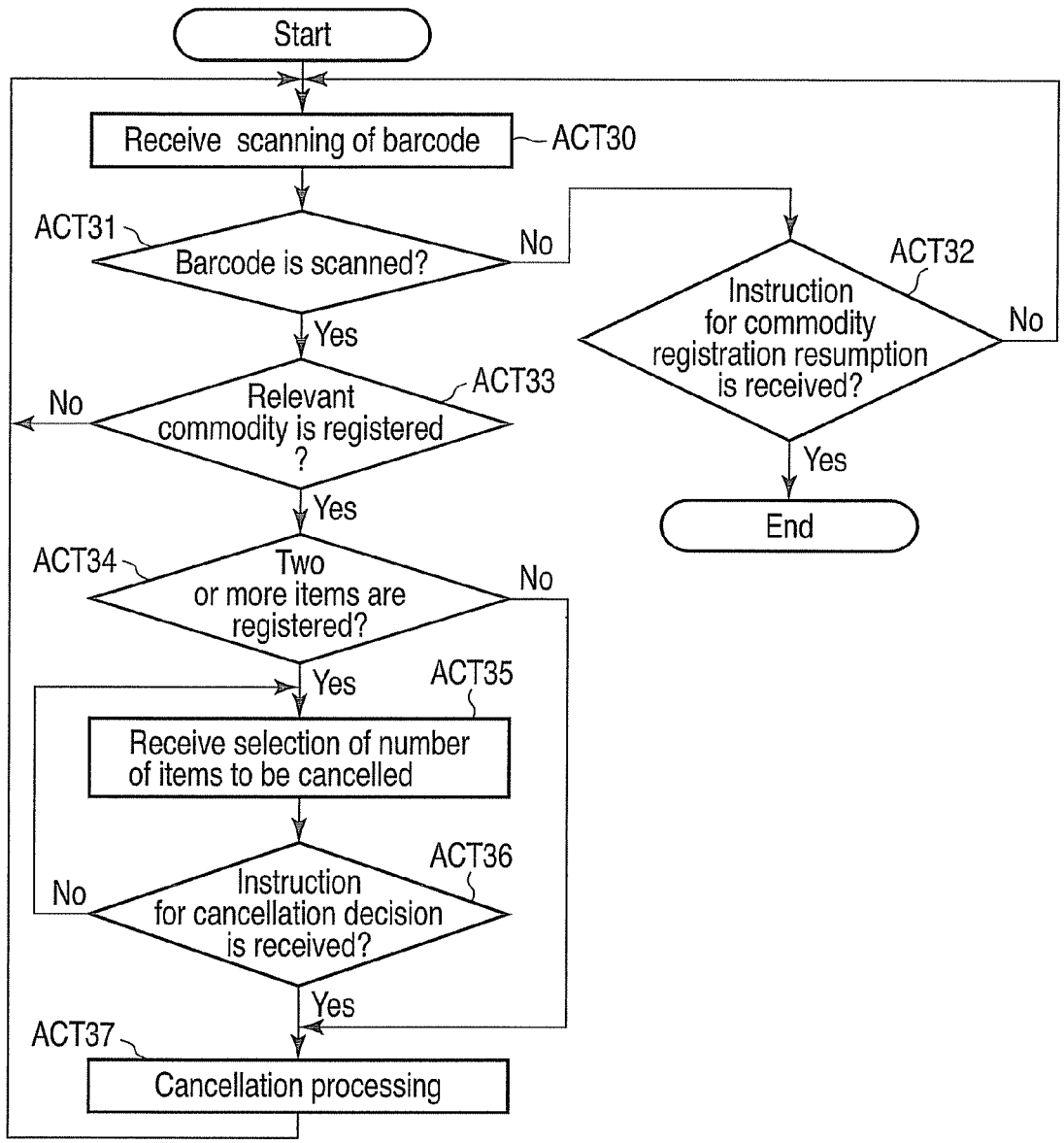
FIG. 10 is a flowchart for explaining processing executed by the CPU in sales data cancellation processing in a second embodiment.

FIG. 10 is a flowchart of processing executed by the CPU 20 in the sales data cancellation processing in this embodiment.

First, in a state for receiving scanning of a barcode by the scanner 27a (Act 30), the CPU 20 waits for instructions for scanning of a barcode and commodity registration resumption (Acts 31 and 32).

If a barcode is scanned according to operation by the customer (Yes in Act 31), the CPU 20 determines whether barcode data (i.e., commodity data) detected by the scanning is registered in the sales data registration area 22a (Act 33). If the barcode data detected by the scanning is not registered in the sales data registration area 22a (No in Act 33), in a state for receiving scanning of a barcode again (Act 30), the CPU 20 waits for instructions for scanning of a barcode and commodity registration resumption (Acts 31 and 32).

On the other hand, if the barcode data detected by the scanning is registered in the sales data registration area 22a (Yes in Act 33), the CPU 20 determines whether the number of sold items of sales data including the barcode data is equal to or larger than two (Act 34). If the number of sold items is equal to or larger than two (Yes in Act 34), the CPU 20 stays on standby in a state for receiving selection of the number of items to be cancelled of the commodity (Acts 35 and 36).

At this point, the number-of-items input screen 130 shown in FIG. 8 is displayed on the display unit 12. The customer operates the operation unit 11 as explained in the first embodiment and inputs the number of items to be cancelled to the number-of-items display area 132a of the number-of-items input screen 130. If the operation button 114 is depressed and decision of cancellation is declared (Yes in Act 36), the CPU 20 cancels a registered commodity according to the content displayed in the display area 132 (Act 37). Specifically, the CPU 20 receives, as the number of items to be cancelled, a numerical value input to the number-of-items display area 132a and subtracts the received number of items from the number of sold items of the sales data registered in the sales data registration area 22a. If the number of sold items of the sales data including the scanned barcode data is one in the processing in Act 34 (No in Act 34), the CPU 20 reduces the number of sold items of the sales data of the commodity registered in the sales data registration area 22a to zero without receiving the input of the number of items to be cancelled of the commodity.

Further, after performing the subtraction, the CPU 20 deletes the number-of-items input screen 130 and displays the cancellation screen 120 shown in FIG. 11 on the display unit 12. The cancellation screen 120 shown in the figure is displayed if two items of the commodity B are cancelled from the sales data registration area 22a shown in FIG. 4. The number of sold items of the commodity B of the sales data registration area 22a is reduced by two from five. As a result, the number of sold items of the commodity B displayed in the display area 121 is reduced to three. Further, the cancellation section 121b (in this example, a section where the sales data of the commodity B is displayed) is displayed in a background color or a character color different from that of a section where the other sales data is displayed. However, in this embodiment, since designation of a commodity as a cancellation target is performed by scanning of a barcode, the selection section 121a shown in FIG. 9 is not shown.

After the sales data is cancelled and the cancellation screen 120 clearly showing the cancellation section is displayed, in a state for receiving scanning of a barcode again (Act 30), the CPU 20 waits for instructions for scanning of a barcode and commodity registration resumption (Acts 31 and 32). If there is no commodity that the customer desires to cancel, the customer depresses, in order to resume commodity registration, the operation button 113 for commodity registration resumption, the guidance of which is displayed in the display area 123 of the cancellation screen 120. At this point, the CPU 20 determines that commodity registration resumption is instructed (Yes in Act 32), ends the sales data cancellation processing, and displays a screen for sales data registration on the display unit 12.

As explained above, the handy terminal 4 included in the commodity sales system in this embodiment scans a barcode attached to a commodity with the scanner 27a to designate a commodity as a cancellation target. Even in such a case, since the customer can designate the number of items to be cancelled using the number-of-items input screen 130, it is unnecessary to scan barcodes of all commodities that the customer desires to cancel. Therefore, if plural commodities identified by the same commodity code are registered in the sales data registration area 22a, work for canceling plural commodities among the commodities is quickened.

Modification

In the embodiments, the customer scans a barcode attached to a commodity with the scanner and detects a commodity code. However, other kinds of symbol codes such as a two-dimensional code may be used instead of the barcode.

It is also possible that the PLU file 6 is stored in a storing unit such as the RAM 22 or the hard disk drive included in the handy terminal 4 and the handy terminal 4 specifies commodity information from the PLU file 6 stored in the storing unit without accessing the store server 1.

A method of inputting the number of items to be cancelled is not always limited to the method of counting up and counting down a numerical value displayed in the number-of-items display area 132a using the operation buttons 111 and 113. Instead, for example, it is also possible that a ten key is provided in the operation unit 11 and the customer directly inputs a desired numerical value. Besides, it is also possible that a touch panel is provided in the display unit 12, an operation button is displayed on a display screen, and the customer touches the operation button to input a numerical value.

In the embodiments, sales data is transmitted to the POS terminal 2 in response to reading of the settlement barcode 7. However, the sales data may be transmitted at other timing. For example, it is also possible that a button for sales data transmission is provided in the operation unit 11 and sales data registered in the sales data registration area 22a is transmitted to the POS terminal 2 when the button is operated.

In the embodiments, the handy terminal 4 reads a symbol code attached to a commodity with the scanner 27a to detect a commodity code and specifies commodity information on the basis of the commodity code. However, commodity information may be specified by other methods. For example, it is also possible that an RFID (Radio Frequency Identification) tag storing therein a commodity code or commodity information is attached to a commodity, a communication unit capable of performing radio communication with the RFID tag is provided in the handy terminal 4, and the handy terminal 4 performs radio communication with the RFID tag via the communication unit to specify the commodity code or the commodity information. Besides, it is also possible that a CCD camera is provided in the handy terminal 4 and the customer picks up an image of a commodity with the CCD camera and recognizes a commodity code through image analysis.

The methods of designating a commodity as a cancellation target in the first and second embodiments may be combined. Specifically, the customer is allowed to use both the method of designating a commodity as a cancellation target using the cancellation screen 120 and the operation unit 11 and the method of designating a commodity as a cancellation target by scanning a barcode attached to a commodity. Then, since the customer can select, according to a situation, a designation method that the customer can easily use, the handy terminal 4 is more easy to use.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A terminal comprising:
a memory storing computer-executable instructions;
a processor, communicatively coupled to the memory, configured to facilitate execution of the computer-executable instructions to at least execute the following units:
an information detecting unit configured to detect commodity information of commodities purchased by a customer;
a storing unit configured to store sales data in which numbers of sold items of the commodities are added to the commodity information detected by the information detecting unit;
a declaring unit configured to declare cancellation of sales data stored in the storing unit;
a selection receiving unit configured to receive, in response to the declaration of the cancellation by the declaring unit, selection of a commodity as a cancellation target out of the commodities indicated by the sales data stored in the storing unit;
an input receiving unit configured to receive input of a number of items to be cancelled of the commodity, the selection of which is received by the selection receiving unit;
a cancellation control unit configured to deduct the number of items, the input of which is received by the input receiving unit, from the number of sold items added to sales data of the commodity as the cancellation target stored in the storing unit;
a display unit; and
an operation unit, wherein the selection receiving unit displays the sales data stored in the storing unit on the display unit as a list in response to declaration of cancellation of the sales data by the declaring unit and receives selection of a commodity as a cancellation target according to operation of the operation unit out of the sales data displayed as a list, wherein
the selection receiving unit changes, after the number of items to be cancelled is deducted from the number of sold items added to the sales data of the commodity as the cancellation target by the cancellation control unit, a display form of the sales data displayed on the display unit as a list such that the sales data of the commodity as the cancellation target and the sales data of the other commodities can be visually distinguished.

2. The terminal according to claim 1,
wherein the input receiving unit displays, on the display unit, an input space for the number of items to be cancelled of the commodity, the selection of which is received by the selection receiving unit, and receives, as the number of items to be cancelled of the commodity, a numerical value input to the input space according to operation of the operation unit.

3. A terminal comprising:
a memory storing computer-executable instructions;
a processor, communicatively coupled to the memory, configured to facilitate execution of the computer-executable instructions to at least execute the following units:
an information detecting unit configured to detect commodity information of commodities purchased by a customer;

a storing unit configured to store sales data in which numbers of sold items of the commodities are added to the commodity information detected by the information detecting unit;

a declaring unit configured to declare cancellation of sales data stored in the storing unit;

a selection receiving unit configured to receive, in response to the declaration of the cancellation by the declaring unit, selection of a commodity as a cancellation target out of the commodities indicated by the sales data stored in the storing unit;

an input receiving unit configured to receive input of a number of items to be cancelled of the commodity, the selection of which is received by the selection receiving unit;

a cancellation control unit configured to deduct the number of items, the input of which is received by the input receiving unit, from the number of sold items added to sales data of the commodity as the cancellation target stored in the storing unit;

a reading unit configured to read a symbol code attached to a commodity and input an identifier of the commodity represented by the symbol code, wherein the selection receiving unit selects, as the commodity as the cancellation target, a commodity indicated by the identifier input by the reading unit among the commodities indicated by the sales data stored in the storing unit; and a display unit, wherein the selection receiving unit displays, after the number of items to be cancelled is deducted from the number of sold items added to the sales data of the commodity as the cancellation target by the cancellation control unit, the sales data stored in the storing unit on the display unit as a list such that the sales data of the commodity as the cancellation target and the sales data of the other commodities can be visually distinguished.

4. The terminal according to claim 3, further comprising:

an operation unit, wherein the input receiving unit displays, on the display unit, an input space for the number of items to be cancelled of the commodity, the selection of which is received by the selection receiving unit, and receives, as the number of items to be cancelled of the commodity, a numerical value input to the input space according to operation of the operation unit.

5. A method of controlling a terminal configured to detect commodity information of commodities purchased by a customer and store, in a storing unit, sales data in which numbers of sold items of the commodities are added to the detected commodity information, the method comprising:

declaring, by the terminal including at least one processor, cancellation of sales data stored in the storing unit;

receiving, in response to the declaration of the cancellation, selection of a commodity as a cancellation target out of the commodities indicated by the sales data stored in the storing unit;

receiving input of a number of items to be cancelled of the commodity, the selection of which is received;

deducting the number of items, the input of which is received, from the number of sold items added to sales data of the commodity as the cancellation target stored in the storing unit;

displaying the sales data stored in the storing unit on a display unit as a list in response to declaration of cancellation of the sales data; and receiving selection of a commodity as a cancellation target according to operation of the operation unit out of the sales data displayed as a list, wherein after the number of items to be cancelled is deducted from the number of sold items added to the sales data of the commodity as the cancellation target by the cancellation control unit, a display form of the sales data is displayed on the display unit as a list such that the sales data of the commodity as the cancellation target and the sales data of the other commodities can be visually distinguished.

* * * * *